Figure 1:
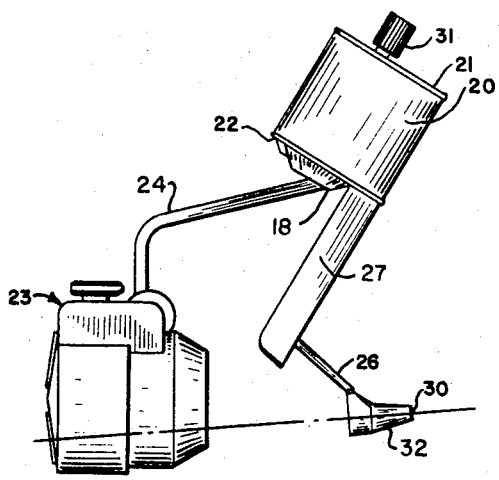

Jan. 31, 1967  J. R. BENFORD  3,301,131

TONOMETER

Filed March 23, 1964

JAMES R. BENFORD
INVENTOR.

BY Frank C. Parker
David E. Dougherty
ATTORNEYS

United States Patent Office 3,301,131
Patented Jan. 31, 1967

3,301,131
TONOMETER
James R. Benford, Irondequoit, N.Y., assignor to Bausch & Lomb Incorporated, Rochester, N.Y., a corporation of New York
Filed Mar. 23, 1964, Ser. No. 353,809
5 Claims. (Cl. 350—149)

This invention relates to an improved tonometer for measuring the intra-ocular or tonometric pressure of an eye.

Apparatus for measuring tonometric pressure of an eye normally utilize plunger or pivot type mechanisms or are based on the principle wherein a predetermined area of the cornea of the eye is flattened by applying a plane surface against the eyeball. In the latter case the tonometric pressure is determined from the ratio between the force with which the surface is applied against the eyeball, and the size of the flattened area of the cornea. The intra-ocular or tonometric pressure opposes deformation or flattening of the cornea so that the intra-ocular pressure multiplied by the flattened area equals the force with which the surface is pressed against the eyeball. For measurements of this kind the eyeball is considered to be spheric in its normal unloaded state. Accordingly, the relationship between the force and the size of the flattened area is an indication of the intra-ocular pressure.

It presently appears that instruments based upon the principle wherein a predetermined area of the cornea of the eye is flattened by applying a plane surface thereto and measuring the force required to flatten the cornea to that area have numerous advantages over the pivot or plunger type devices. It also appears that those devices wherein the tonometric pressure is determined by a ratio between the force and flattened surface will substantially replace the plunger and pivot type devices and meet with relatively widespread commercial acceptance. One such device which has already achieved some commercial success is disclosed in the U.S. patent of Papritz et al. 3,070,997.

The device disclosed by Papritz et al. relates to apparatus wherein the force with which the surface is applied against the eyeball is adjusted to a value for which the flattened area is a predetermined constant size for each measurement, and the adjusted force is a measure of the tonometric pressure. In instruments of this type, as well as those according to the present invention, the area of the flattened portion is preferably of relatively small size i.e. of a diameter of about three millimeters. When areas of this size are applanated a relatively small volume of the eyeball is displaced and therefore the intra-ocular pressure is not substantially increased by the measurement.

Normally the force is adjusted until the predetermined area is flattened. Accordingly the measurement of the flattened area is relatively critical in order to obtain a reliable determination of tonometric pressure. In order to facilitate the measurement of the flattened area and to minimize errors in such measurements, it has been proposed to observe the circumference of the flattened area through an optical system. The optical system optically divides the circumference into two semi-circles which are optically displaced relative to each other. The distance of displacement is equal to the diameter of the predetermined flattened area when the semi-circles are no longer displaced but appear as a continuous S-shaped curve. The measurement is for example carried out by adjusting the force with which the plane surface is pressed against the cornea and at the same time observing the flattened area through the optical system. In order to obtain a clearly visible shape contour of the flattened area, a fluorescein dye may preferably be applied to the cornea.

The flattened area appears dark since the dye has been squeezed out over this area, wherein the non-flattened area appears bright due to the presence of the dye in this area.

The present invention is primarily directed toward improved means for splitting the image in an applanation tonometer of the aforementioned type. Briefly, the image splitting means consists essentially of two pieces of anisotropic crystal such as optical grade calcite with optic axes inclined to the polished end faces. The inclination is in opposed relationship in the two halves to thereby create a doubling in a direction parallel to the cemented interface between the two halves. A Polaroid filter is fixed to the end of the two crystal halves to thereby eliminate the undeviated or ordinary ray in each half.

Figure 5:
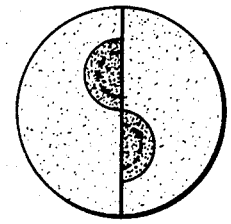
Figure 2:
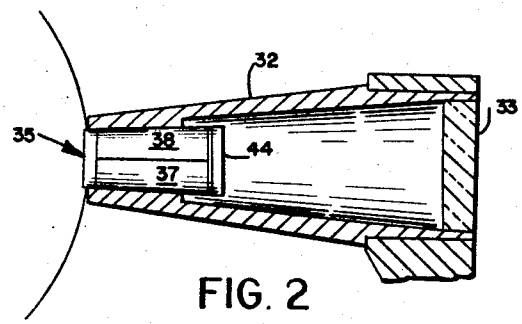
Figure 3:
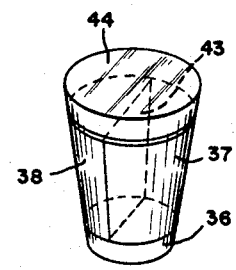
Figure 4:
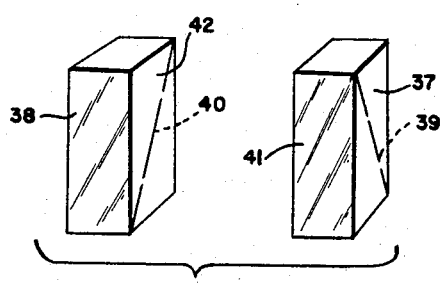

The invention will now be described in more detail in connection with the accompanying drawing in which:

FIG. 1 is a side elevational view of an applanation tonometer which includes the image splitting means according to the present invention, FIG. 2 is a partial sectional view on a larger scale illustrating the mounted image splitting means for an applanation tonometer according to the present invention, FIG. 3 is a perspective view illustrating the unmounted image-splitting means for an applanation tonometer according to the present invention, FIG. 4 is a perspective view illustrating the relative axial positions of the anisotropic crystals utilized in the present invention, and FIG. 5 is a schematic illustration showing the view observed when looking through an applanation tonometer according to the present invention.

FIG. 1 illustrates a tonometer according to the present invention which includes a body 20 having an upper and lower plate 21 and 22 for enclosing the weight adjusting mechanism. The tonometer is attached to a microscope 23 by means of an arm 24. The microscope 23 may comprise a so-called slit lamp or some other optical magnifying system which is suitable for use with the tonometer.

An arm 26 extends through a shell 27 and is operatively connected to a counter weight not shown. The lever arm 26 may execute a swinging motion. A flat surface 30 is forced against the cornea of the eye by turning a knob 31. The amount of pressure exerted against the cornea of the eye will be indicated by means of a dial 18. The mechanism for increasing the force may be of any conventional design, see for example, the aforementioned patent of Papritz et al. No. 3,070,997.

A tubular body 32 shown more clearly in FIG. 2 is disposed at the end of the lever 26 and is sealed at the rear surface by means of a transparent plate 33. The forward portion of the tubular body 32 is sealed by an image splitting means 35 according to the present invention. The image splitting means will be described in conjunction with FIGS. 2–4.

The image splitting means defines a shape generally similar to the frustum of a cone. The forward flat surface 30 i.e. the surface which comes into contact with the cornea of the eye comprises a cover glass 36 which is transparent and preferably includes plane parallel surfaces. A pair of anisotropic crystals 37 and 38 such as calcite are disposed with their optic axes inclined to the polished end faces. The position of the axes 39, 40 of the crystals 37 and 38 are shown more clearly in FIG. 4. The surfaces 41, 42 are cemented together to form the interface 43.

The inclination of the axes 39 and 40 are in opposed relationship in the two halves i.e. in each of the pairs 37 and 38 to thereby create a doubling in a direction parallel to the cemented interface 43. A polarizing filter 44 is cemented to the end of the two anisotropic crystals and is so constructed and arranged to eliminate the undeviated image in each crystal i.e. to eliminate the ordinary rays.

When the flat surface 30 is pressed against the cornea of an eye, the effect is viewed through the microscope 23. As the force is increased to thereby increase the flattened area the circular contour is seen as two laterally displaced semi-circles. The two laterally displaced semi-circles are shown by the dotted lines in FIG. 5. As the surface 30 is forced against the cornea with an increasing amount of pressure, the diameter of the flattened area increases and the near ends of the displaced semi-circles will approach each other. When the semi-circles are observed as touching, or as a continuous S-shaped curve shown in FIG. 5, the predetermined area has been flattened. An indication of the force exerted on the body 32 is therefore an indication of the tonometric pressure.

It is desirable to apply a solution of fluorescein to the cornea prior to flattening it in order to improve the contrast of the image. The use of fluorescein together with a blue filter results in a final image wherein the flattened area has a dark blue color against a yellow background.

While the invention has been described in connection with a preferred embodiment, it should be understood that the devices according to the present invention may be modified and embodied in other forms without departing from the scope of the appended claims.

What is claimed is:
1. An optical element for an applanation tonometer comprising a pair of anisotropic crystals, each having a substantially flat polished end face, the optic axes of said crystals being inclined to form substantially equal acute angles to the plane of the polished end faces, means for coupling said pair of crystals so that the optic axes form an angle with respect to each other, a polarizing filter coupled to said pair of crystals for eliminating the undeviated ray in each crystal whereby the contour of the end faces as viewed through the polarizing filter is seen as a laterally displaced split image.

2. An optical element according to claim 1 in which the crystals comprise calcite.

3. An optical element according to claim 1 in which a plane parallel cover glass is disposed on the forward polished end face of said crystals.

4. An optical element for an applanation tonometer comprising, a pair of anisotropic crystals having substantially flat end faces and having their optical axes inclined to form substantially equal acute angles to the plane of the flat ends, means for coupling said pair of crystals together so that the optical axes of said pair of crystals form an angle with respect to each other, and polarizing filter means coupled to one of said flat ends of said coupled pair of crystals so that the contour of the other of said flat ends appears as a split image.

5. The optical element as defined in claim 4 wherein said flat ends of said pair of crystals other than that coupled to said polarizing filter means are formed with a semi-circular contour and define a circle when coupled, so that said contour as viewed through said polarizing filter means appears as two laterally displaced semi-circles.

References Cited by the Examiner

UNITED STATES PATENTS

| | | | |
|---|---|---|---|
| 2,174,308 | 9/1939 | Hartinger | 88—14 |
| 2,412,074 | 12/1946 | Benford | 88—14 |
| 3,070,997 | 1/1963 | Papritz et al. | 73—80 |

RICHARD C. QUIESSER, *Primary Examiner.*

J. J. SMITH, *Assistant Examiner.*